US012146863B2

(12) United States Patent
Ueshiro et al.

(10) Patent No.: US 12,146,863 B2
(45) Date of Patent: Nov. 19, 2024

(54) ULTRASONIC FLAW DETECTION DEVICE AND METHOD FOR CONTROLLING SAME

(71) Applicants: MITSUBISHI HEAVY INDUSTRIES, LTD., Tokyo (JP); MITSUBISHI HEAVY INDUSTRIES MACHINERY SYSTEMS, LTD., Kobe (JP)

(72) Inventors: Kazuhiro Ueshiro, Hyogo (JP); Mitsuyoshi Uematsu, Tokyo (JP); Hiroshi Takemoto, Tokyo (JP); Yuki Tokita, Tokyo (JP)

(73) Assignees: MITSUBISHI HEAVY INDUSTRIES, LTD., Tokyo (JP); MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 483 days.

(21) Appl. No.: 17/438,636

(22) PCT Filed: Apr. 15, 2019

(86) PCT No.: PCT/JP2019/016171
§ 371 (c)(1),
(2) Date: Sep. 13, 2021

(87) PCT Pub. No.: WO2020/213038
PCT Pub. Date: Oct. 22, 2020

(65) Prior Publication Data
US 2022/0221430 A1 Jul. 14, 2022

(51) Int. Cl.
*G01N 29/265* (2006.01)
*G01N 29/04* (2006.01)
(Continued)

(52) U.S. Cl.
CPC .......... *G01N 29/265* (2013.01); *G01N 29/04* (2013.01); *G01N 29/28* (2013.01); *G01N 29/34* (2013.01)

(58) Field of Classification Search
CPC .................. G01N 29/00; G01N 29/04; G01N 29/22–265; G01N 29/28; G01N 29/34
See application file for complete search history.

(56) References Cited

U.S. PATENT DOCUMENTS

| 7,640,811 | B2 * | 1/2010 | Kennedy | G01N 29/265 |
| | | | | 73/602 |
| 11,105,777 | B2 * | 8/2021 | Matsumoto | G01N 29/225 |

(Continued)

FOREIGN PATENT DOCUMENTS

| JP | S62-056845 A | 3/1987 |
| JP | H06-051865 U | 7/1994 |

(Continued)

OTHER PUBLICATIONS

PCT/ISA/210, "International Search Report for International Application No. PCT/JP2019/016171," Jul. 16, 2019.

*Primary Examiner* — Nguyen Q. Ha
(74) *Attorney, Agent, or Firm* — HAUPTMAN HAM, LLP

(57) ABSTRACT

An ultrasonic flaw detection device comprises a flaw detection unit for transmitting and receiving ultrasound, a swinging mechanism for supporting the flaw detection unit to swing around a swinging axis, and a locking mechanism for switching between a swinging state and a locked state. The ultrasonic flaw detection device controls the locking mechanism and swinging mechanism such that when the flaw detection unit is moved along a direction tangential to a surface to be inspected from a position removed from a first end part of the surface to be inspected to a lock release position, the flaw detection unit is put in the locked state such that a direction tangential to a contact surface and the direction tangential to the surface to be inspected coincide, and the flaw detection unit is switched from the locked state (Continued)

to the swinging state after the flaw detection unit reaches the lock release position.

7 Claims, 11 Drawing Sheets

(51) Int. Cl.
*G01N 29/28* (2006.01)
*G01N 29/34* (2006.01)

(56) References Cited

U.S. PATENT DOCUMENTS

| | | |
|---|---|---|
| 2012/0006132 A1 | 1/2012 | Faucher et al. |
| 2018/0172642 A1 | 6/2018 | Barry et al. |

FOREIGN PATENT DOCUMENTS

| | | | | |
|---|---|---|---|---|
| JP | 2001-183349 A | | 7/2001 | |
| JP | 2016-080405 A | | 5/2016 | |
| JP | 2018536164 A | * | 6/2018 | ............. G01N 20/04 |

* cited by examiner

ULTRASONIC FLAW DETECTION DEVICE AND METHOD FOR CONTROLLING SAME

RELATED APPLICATIONS

The present application is National Phase of International Application No. PCT/JP2019/016171 filed Apr. 15, 2019, the disclosure of which is hereby incorporated by reference herein in its entirety.

TECHNICAL FIELD

The present invention relates to an ultrasonic flaw detection device and a method for controlling the ultrasonic flaw detection device.

BACKGROUND ART

In the related art, an ultrasonic flaw detection device that performs flaw detection by bringing an ultrasonic probe into contact with the surface of an object-to-be-inspected is known (refer to, for example, PTL 1). PTL 1discloses an ultrasonic flaw detection device in which an ultrasonic probe can be elastically and freely inclined over the entire periphery of a support rod supporting the ultrasonic probe such that a vibration generating surface of the ultrasonic probe is parallel to and in close contact with the surface of an object-to-be-inspected having a curved surface.

CITATION LIST

[PTL 1] Japanese Unexamined Patent Application Publication No. 62-56845

SUMMARY OF INVENTION

Technical Problem

In a case of attempting to inspect the entire region of the surface of an object-to-be-inspected with an ultrasonic probe, since at an end portion of the object-to-be-inspected, only a part of a contact surface of the ultrasonic probe with the object-to-be-inspected comes into contact with the surface of the object-to-be-inspected, it is difficult to move the probe while pressing it against the surface of the object-to-be-inspected with a desired strength. Therefore, in order to inspect an end portion region of the object-to-be-inspected, it is necessary to cause the probe to enter the end portion of the object-to-be-inspected from a position separated from the end portion of the object-to-be-inspected.

However, in the ultrasonic flaw detection device disclosed in PTL 1, the probe can be freely inclined with respect to the support rod supporting the probe. Therefore, when moving the probe from the position separated from the end portion of the object-to-be-inspected along a tangential direction to the surface of the object-to-be-inspected, there is a possibility that depending on an inclination angle of the probe, the probe may collide with the end portion of the object-to-be-inspected. Further, since the inclination angle of the probe is not fixed, there is a possibility that a gap may be created between the probe and the object-to-be-inspected, making the flaw detection inspection impossible.

The present invention has been made in view of such circumstances and has an object to provide an ultrasonic flaw detection device in which it is possible to inspect the entire region of the surface of an object-to-be-inspected including an end portion without causing a flaw detection unit to collide with the end portion of the object-to-be-inspected.

Solution to Problem

In order to solve the above problem, an ultrasonic flaw detection device according to the present invention adopts the following means.

According to an aspect of the present invention, there is provided an ultrasonic flaw detection device including: a flaw detection mechanism that inspects an object-to-be-inspected by transmitting and receiving ultrasonic waves; a movement mechanism that moves a position of the flaw detection mechanism with respect to the object-to-be-inspected; and a control unit that controls the flaw detection mechanism and the movement mechanism, in which the flaw detection mechanism includes a flaw detection unit having a probe that transmits and receives the ultrasonic waves and a contact part on which a contact surface that comes into contact with a surface-to-be-inspected of the object-to-be-inspected is formed, a swinging mechanism that supports the flaw detection unit so as to be swingable around a swinging axis, and a lock mechanism that switches between a swinging state where the flaw detection unit can swing around the swinging axis and a locked state where the flaw detection unit cannot swing around the swinging axis, and the control unit controls the lock mechanism and the movement mechanism so as to cause the flaw detection unit to be in the locked state in a state where a tangential direction to the contact surface and a tangential direction to the surface-to-be-inspected coincide with each other, when moving the flaw detection unit from a position separated from a first end portion of the surface-to-be-inspected to a lock release position in the vicinity of the first end portion along the tangential direction to the surface-to-be-inspected, and switch the locked state to the swinging state after the flaw detection unit has reached the lock release position.

According to the ultrasonic flaw detection device according to an aspect of the present invention, when moving the flaw detection unit to the lock release position along the tangential direction to the surface-to-be-inspected, a state is maintained where the tangential direction to the contact surface of the flaw detection unit and the tangential direction to the surface-to-be-inspected of the object-to-be-inspected coincide with each other. Therefore, it is possible to bring the contact surface of the flaw detection unit into contact with the surface of an end portion of the object-to-be-inspected without the contact of the flaw detection unit with the end portion of the object-to-be-inspected. Since the flaw detection unit is in the locked state, a state where the entire region of the contact surface of the flaw detection unit is in contact with the surface-to-be-inspected of the object-to-be-inspected is maintained, and thus it is possible to avoid the flaw detection inspection from becoming impossible due to the occurrence of a gap due to the non-contact between the contact surface and the surface-to-be-inspected.

In the ultrasonic flaw detection device according to an aspect of the present invention, a configuration may be made in which the control unit controls the lock mechanism and the movement mechanism so as to move the flaw detection unit in the swinging state from a first position separated by a first distance in a normal direction to the surface-to-be-inspected from the surface-to-be-inspected until the contact surface comes into contact with the surface-to-be-inspected, switch the swinging state to the locked state in a state where the contact surface is in contact with the surface-to-beinspected, move the flaw detection unit to a second position separated in the tangential direction to the surface-to-be-inspected from the first end portion of the surface-to-be-inspected and separated by a second distance shorter than the first distance in the normal direction to the surface-to-be-inspected, and move the flaw detection unit in the locked state to the lock release position along the tangential direction to the surface-to-be-inspected.

According to the ultrasonic flaw detection device of this configuration, by moving the flaw detection unit in the swinging state from the first position to bring the contact surface into contact with the surface-to-be-inspected and switching it to the locked state in that state, it is possible to create a state where the tangential direction to the contact surface of the flaw detection unit coincides with the tangential direction to the surface-to-be-inspected of the object-to-be-inspected, and maintain the state. Further, by moving the flaw detection unit from the second position closer to the surface-to-be-inspected than the first position to the lock release position, it is possible to avoid the flaw detection unit from colliding with the end portion of the object-to-be-inspected.

In the ultrasonic flaw detection device according to an aspect of the present invention, the control unit may control the lock mechanism and the movement mechanism so as to move the flaw detection unit along the surface-to-be-inspected while maintaining a state where the contact surface is in contact with the surface-to-be-inspected, after the flaw detection unit reaches the lock release position and the locked state is switched to the swinging state.

By moving the flaw detection unit in the swinging state along the surface-to-be-inspected while maintaining a state where the contact surface is in contact with the surface-to-be-inspected, it is possible to perform the flaw detection while adjusting the contact surface to an appropriate angle along the shape of the surface-to-be-inspected.

In the ultrasonic flaw detection device according to an aspect of the present invention, the control unit may control the lock mechanism and the movement mechanism so as to switch the swinging state to the locked state in response to arrival of the flaw detection unit in the swinging state at a lock start position in the vicinity of a second end portion of the surface-to-be-inspected, and move the flaw detection unit in the locked state to a third position separated in the tangential direction to the surface-to-be-inspected from the second end portion along the tangential direction to the surface-to-be-inspected.

If the flaw detection unit is in the swinging state when performing the flaw detection on the end portion of the surface-to-be-inspected, there is a possibility that the flaw detection unit may swing when the flaw detection unit passes through the end portion. In this case, a gap is formed between the contact surface of the flaw detection unit and the surface-to-be-inspected, so that a state is created where the flaw detection of an end portion region of the surface-to-be-inspected is not performed. Therefore, in the ultrasonic flaw detection device according to an aspect of the present invention, the flaw detection unit is moved to the third position after switching from the swinging state to the locked state. In this way, it is possible to avoid a state where the flaw detection of the end portion region of the surface-to-be-inspected is not performed.

In the ultrasonic flaw detection device according to an aspect of the present invention, the swinging mechanism may be a mechanism that swings the flaw detection unit around a pair of swinging axes orthogonal to each other, and the lock mechanism may be a mechanism that switches between a swinging state where the flaw detection unit can swing around the pair of swinging axes and a locked state where the flaw detection unit cannot swing around the pair of swinging axes.

Since the swinging mechanism swings the flaw detection unit around the pair of swinging axes, even in a case where the surface-to-be-inspected of the object-to-be-inspected has a three-dimensional curved surface shape having curvatures in a plurality of directions, it is possible to swing the flaw detection unit such that the tangential direction to the surface-to-be-inspected of the object-to-be-inspected and the tangential direction to the contact surface coincide with each other. Further, since the lock mechanism can create a locked state of making it impossible to swing around the pair of swinging axes, it is possible to fix the contact surface of the flaw detection unit at an appropriate swinging angle according to the three-dimensional curved surface shape.

In the ultrasonic flaw detection device according to an aspect of the present invention, the flaw detection unit may be a local water immersion type flaw detection unit having a contact medium holding part for filling a space between the probe and the surface-to-be-inspected with a contact medium. By adopting the local water immersion type flaw detection unit, it is possible to perform the flaw detection of the object-to-be-inspected without using a large-scale facility for immersing the object-to-be-inspected in water.

In the ultrasonic flaw detection device according to an aspect of the present invention, the flaw detection unit may be a water immersion type flaw detection unit that transmits and receives ultrasonic waves in a state where the surface-to-be-inspected of the object-to-be-inspected immersed in water is in contact with the contact surface. By adopting the water immersion type flaw detection unit, it is possible to reliably maintain a state where water is filled between the probe and the surface of the object-to-be-inspected, and improve the accuracy of the flaw detection.

According to another aspect of the present invention, there is provided a method for controlling an ultrasonic flaw detection device that includes a flaw detection unit having a probe that transmits and receives ultrasonic waves and a contact surface that comes into contact with a surface-to-be-inspected of an object-to-be-inspected, a swinging mechanism that supports the flaw detection unit so as to be swingable around a swinging axis, and a lock mechanism that switches between a swinging state where the flaw detection unit can swing around the swinging axis and a locked state where the flaw detection unit cannot swing around the swinging axis, the method including: a first control step of causing the flaw detection unit to be in the locked state in a state where a tangential direction to the contact surface and a tangential direction to the surface-to-be-inspected coincide with each other; a second control step of moving the flaw detection unit in the locked state along the tangential direction to the surface-to-be-inspected from a position separated from a first end portion of the surface-to-be-inspected to a lock release position in the vicinity of the first end portion; a third control step of switching the locked state to the swinging state after the flaw detection unit has reached the lock release position; and a fourth control step of moving the flaw detection unit along the surface-to-be-inspected while maintaining a state where the contact surface is in contact with the surface-to-be-inspected.

According to the method for controlling an ultrasonic flaw detection device according to an aspect of the present invention, when moving the flaw detection unit to the lock release position along the tangential direction to the surface-to-be-inspected, a state is maintained where the tangential direction to the contact surface of the flaw detection unit and the tangential direction to the surface-to-be-inspected of the object-to-be-inspected coincide with each other. Therefore, it is possible to bring the contact surface of the flaw detection unit into contact with the surface of an end portion of the object-to-be-inspected without the contact of the flaw detection unit with the end portion of the object-to-be-inspected. Since the flaw detection unit is in the locked state, a state where the entire region of the contact surface of the flaw detection unit is in contact with the surface of the object-to-be-inspected is maintained, and thus it is possible to avoid the flaw detection inspection from becoming impossible due to the occurrence of a gap due to the non-contact between the contact surface and the surface of the object-to-be-inspected.

Advantageous Effects of Invention

According to the present invention, it is possible to provide an ultrasonic flaw detection device in which it is possible to inspect the entire region of the surface of the object-to-be-inspected including an end portion without causing the flaw detection unit to collide with the end portion of the object-to-be-inspected.

DESCRIPTION OF EMBODIMENTS

Figure 1:
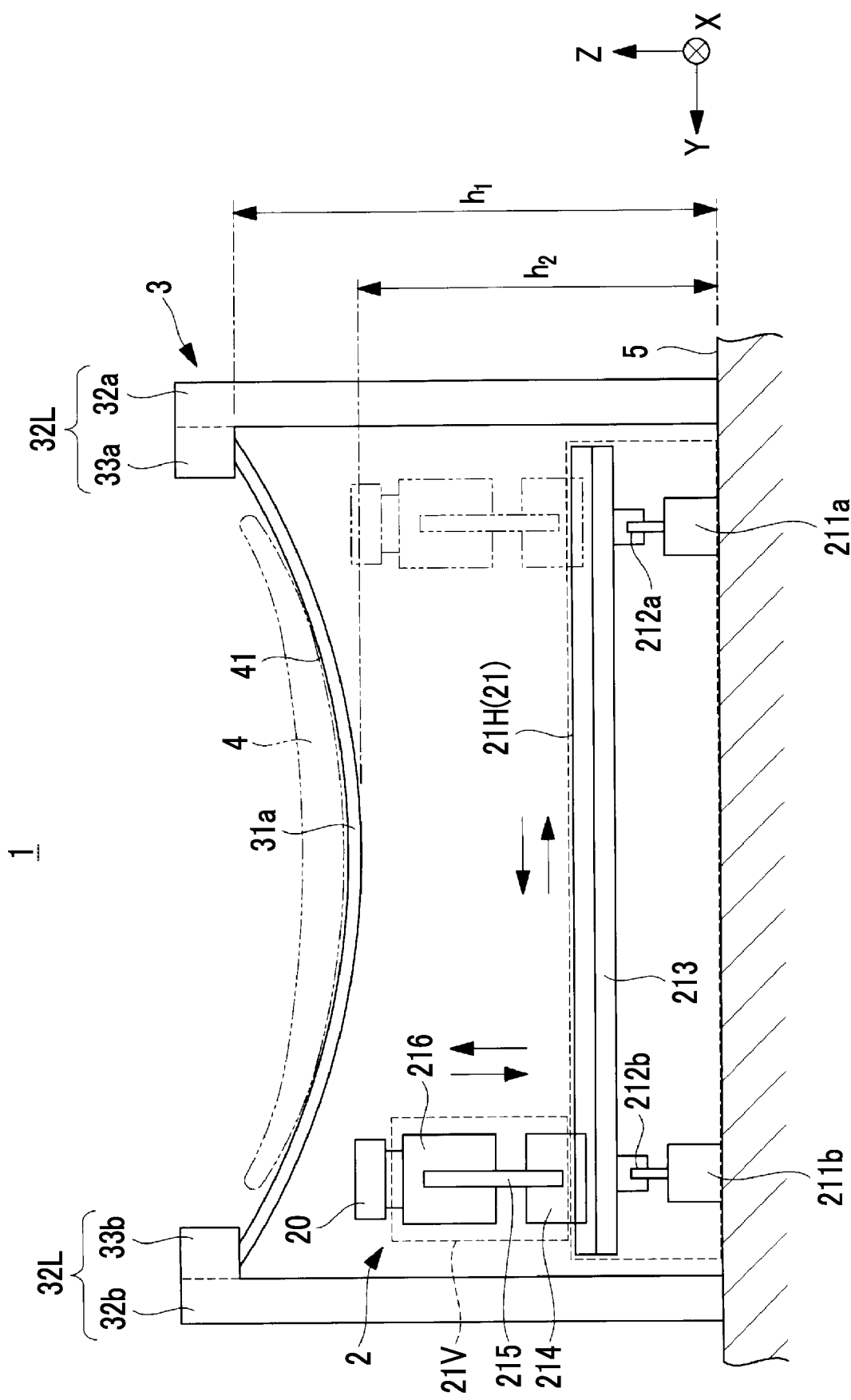
FIG. 1 is a side view showing an ultrasonic flaw detection system according to an embodiment of the present invention.
Figure 2:
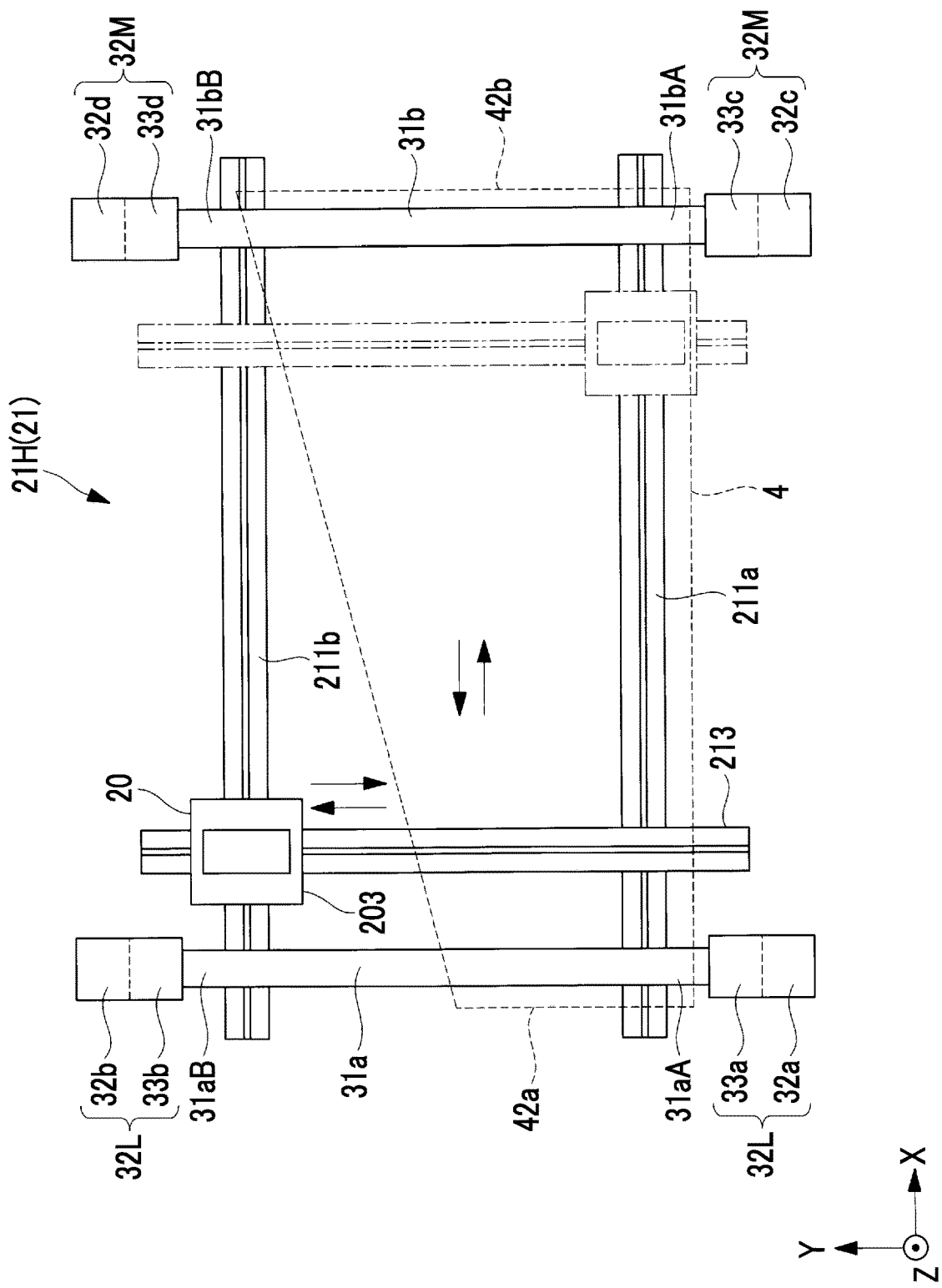
FIG. 2 is a plan view of the ultrasonic flaw detection system shown in FIG. 1, as viewed from above.

Hereinafter, an ultrasonic flaw detection system 1 according to an embodiment of the present invention will be described with reference to the drawings. FIG. 1 is a side view showing the ultrasonic flaw detection system 1 according to an embodiment of the present invention. FIG. 2 is a plan view of the ultrasonic flaw detection system 1 shown in FIG. 1, as viewed from above.

As shown in FIGS. 1 and 2, the ultrasonic flaw detection system 1 of the present embodiment includes a local water immersion type ultrasonic flaw detection device 2 and a holding device 3. A composite material 4 is an object-to-be-inspected that is an inspection target by the ultrasonic flaw detection system 1. The ultrasonic flaw detection device 2 includes a flaw detection head (flaw detection mechanism) 20 for inspecting (flaw detection) the composite material 4 by transmitting and receiving ultrasonic waves, and a movement mechanism 21 that supports the flaw detection head 20 and moves the position of the flaw detection head 20 with respect to the composite material 4.

First, the holding device 3 will be described. The holding device 3 is a device for holding the composite material 4 at a predetermined position with respect to a floor surface 5. As shown in FIGS. 1 and 2, the holding device 3 includes a first base part 32L and a second base part 32M, in addition to a first belt 31a and a second belt 31b.

The first base part 32L suspends and supports a first protrusion portion 42a of the composite material 4. The first base part 32L has a first column 32a, a second column 32b, a first fixing portion 33a, and a second fixing portion 33b. The second base part 32M suspends and supports a second protrusion portion 42b of the composite material 4. The second base part 32M has a third column 32c, a fourth column 32d, a third fixing portion 33c, and a fourth fixing portion 33d.

As shown in FIG. 2, the first column 32a, the second column 32b, the third column 32c, and the fourth column 32d suspend and support the composite material 4, and are disposed around a horizontal movement mechanism such that the longitudinal direction of each column is perpendicular (vertical) to the floor surface 5. The second column 32b is separated from the first column 32a in a positive direction of a Y axis. The third column 32c is separated from the first column 32a in a positive direction of an X axis. The fourth column 32d is separated from the third column 32c in the positive direction of the Y axis.

The first fixing portion 33a and the second fixing portion 33b are configured to fix two end portions of the first belt 31a. The first fixing portion 33a is mounted to the first column 32a at a position at a height h1 from the floor surface 5. The second fixing portion 33b is mounted to the second column 32b at the position at the height h1 from the floor surface 5. On the other hand, the third fixing portion 33c and the fourth fixing portion 33d are configured to fix two end portions of the second belt 31b. The third fixing portion 33c is mounted to the third column 32c at the position at the height h1 from the floor surface 5. The fourth fixing portion 33d is mounted to the fourth column 32d at the position at the height h1 from the floor surface 5.

The first belt 31a has a first end portion 31aA and a second end portion 31aB. The first end portion 31aA is fixed to the first fixing portion 33a. The second end portion 31aB is fixed to the second fixing portion 33b. The first belt 31a is connected to the first base part 32L and suspends and supports the first protrusion portion 42a. Similarly, the second belt 31b has a first end portion 31bA and a second end portion 31bB. The first end portion 31bA is fixed to the third fixing portion 33c. The second end portion 31bB is fixed to the fourth fixing portion 33d. The second belt 31b is connected to the second base part 32M and suspends and supports the second protrusion portion 42b.

The lengths of the first belt 31a and the second belt 31b are set to be slightly longer than the distance between the first column 32a and the second column 32b such that when the composite material 4 is disposed, the composite material 4 is suspended and supported at a position at a height h2 from the floor surface 5. Therefore, as shown in FIG. 1, the first belt 31a hangs down in the vicinity of the center between the first column 32a and the second column 32b when viewed from the side. Similarly, the second belt 31b hangs down in the vicinity of the center between the third column 32c and the fourth column 32d. The height h2 is slightly lower than the height h1 at which each of the first fixing portion 33a to the fourth fixing portion 33d is mounted.

Next, the movement mechanism 21 of the ultrasonic flaw detection device 2 will be described.

As shown in FIGS. 1 and 2, the movement mechanism 21 includes a horizontal movement mechanism 21H and a vertical movement mechanism 21V. The horizontal movement mechanism 21H and the vertical movement mechanism 21V are mechanisms that move the position of the flaw detection head 20 with respect to the composite material 4 to any position below the composite material 4. The horizontal movement mechanism 21H is configured to move the flaw detection head 20 horizontally with respect to the floor surface 5. The horizontal movement mechanism 21H includes an X-axis direction movement mechanism and a Y-axis direction movement mechanism.

The X-axis direction movement mechanism is configured to linearly move the flaw detection head 20 in the X-axis direction. Specifically, the X-axis direction movement mechanism includes a first traveling rail 211a having a linear shape, a first block 212a that freely slides along the first traveling rail 211a, a second traveling rail 211b having a linear shape, and a second block 212b that freely slides along the second traveling rail 211b.

As shown in FIG. 2, the first traveling rail 211a and the second traveling rail 211b are laid on the floor surface 5 along the X-axis direction so as to be parallel to each other. The distance between the first traveling rail 211a and the second traveling rail 211b can be suitably changed in accordance with the size of the composite material 4. The lengths of the first traveling rail 211a and the second traveling rail 211b can also be suitably changed in accordance with the size of the composite material 4.

The first block 212a moves along the first traveling rail 211a from the negative direction of the X axis to the positive direction of the X axis or vice versa. The second block 212b moves along the second traveling rail 211b from the negative direction of the X axis to the positive direction of the X axis or vice versa. The first block 212a and the second block 212b simultaneously move at the same speed.

The Y-axis direction movement mechanism is configured to linearly move the flaw detection head 20 in the Y-axis direction. Specifically, the Y-axis direction movement mechanism includes a traverse rail 213 and a third block 214 that freely slides along the traverse rail 213. The length of the traverse rail 213 is slightly longer than the distance between the first traveling rail 211a and the second traveling rail 211b. The traverse rail 213 is disposed on both the first block 212a and the second block 212b. The third block 214 moves along the traverse rail 213 from the negative direction of the Y axis to the positive direction of the Y axis or vice versa.

As shown in FIG. 1, the vertical movement mechanism 21V is configured to linearly move the flaw detection head 20 in the vertical direction (Z-axis direction) with respect to the floor surface 5. The vertical movement mechanism 21V includes a vertical rail 215 having a linear shape and a fourth block 216 that freely slides along the vertical rail 215. The vertical rail 215 is disposed on the third block 214 such that the longitudinal direction thereof is perpendicular to the floor surface 5. The flaw detection head 20 is disposed on the fourth block 216. The fourth block 216 moves along the vertical rail 215 from the negative direction of the Z axis to the positive direction of the Z axis or vice versa.

Figure 3:
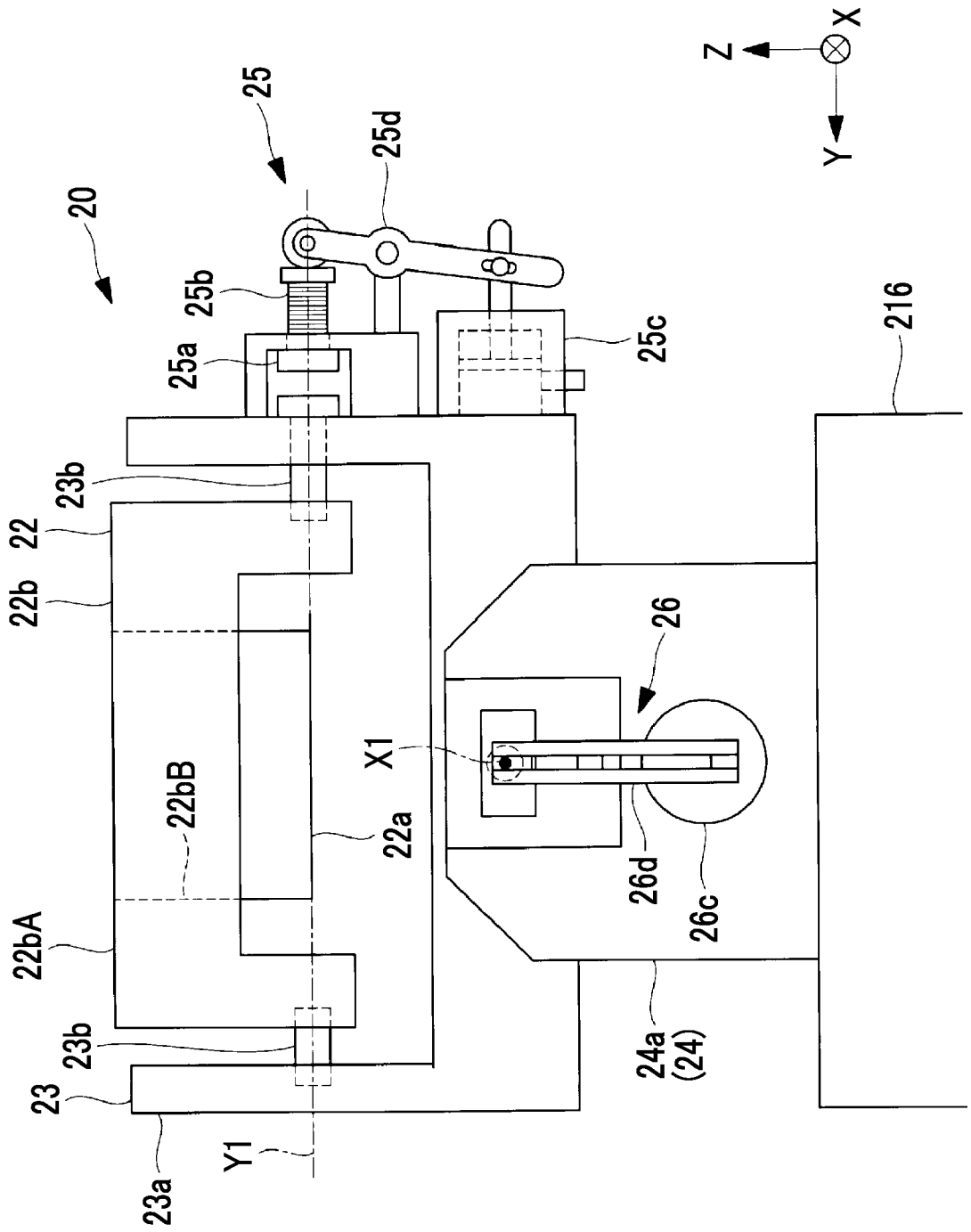
FIG. 3 is a side view of a flaw detection head shown in FIG. 1, as viewed in an X direction.
Figure 4:
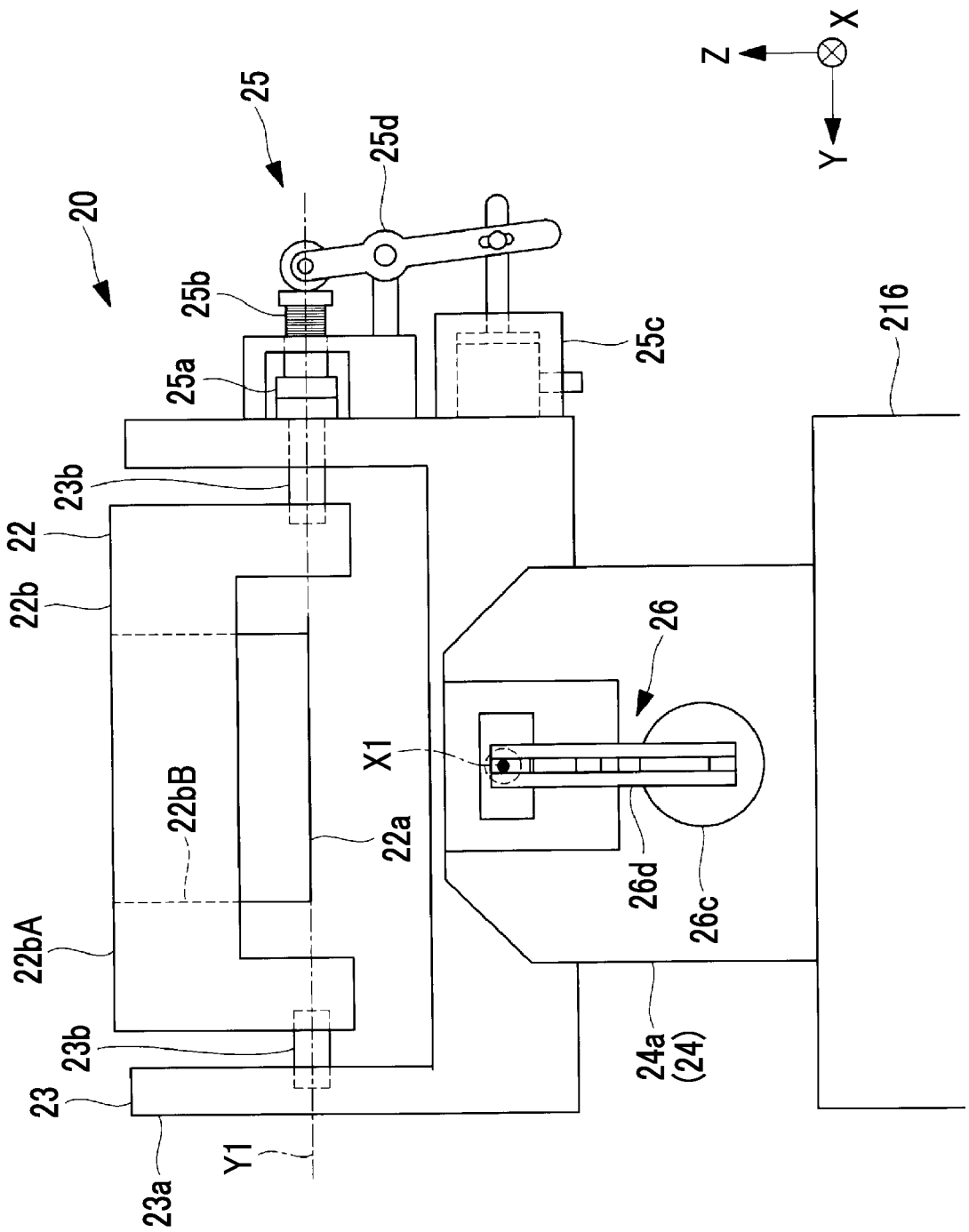
FIG. 4 is a side view of the flaw detection head shown in FIG. 1, as viewed in the X direction.
Figure 5:
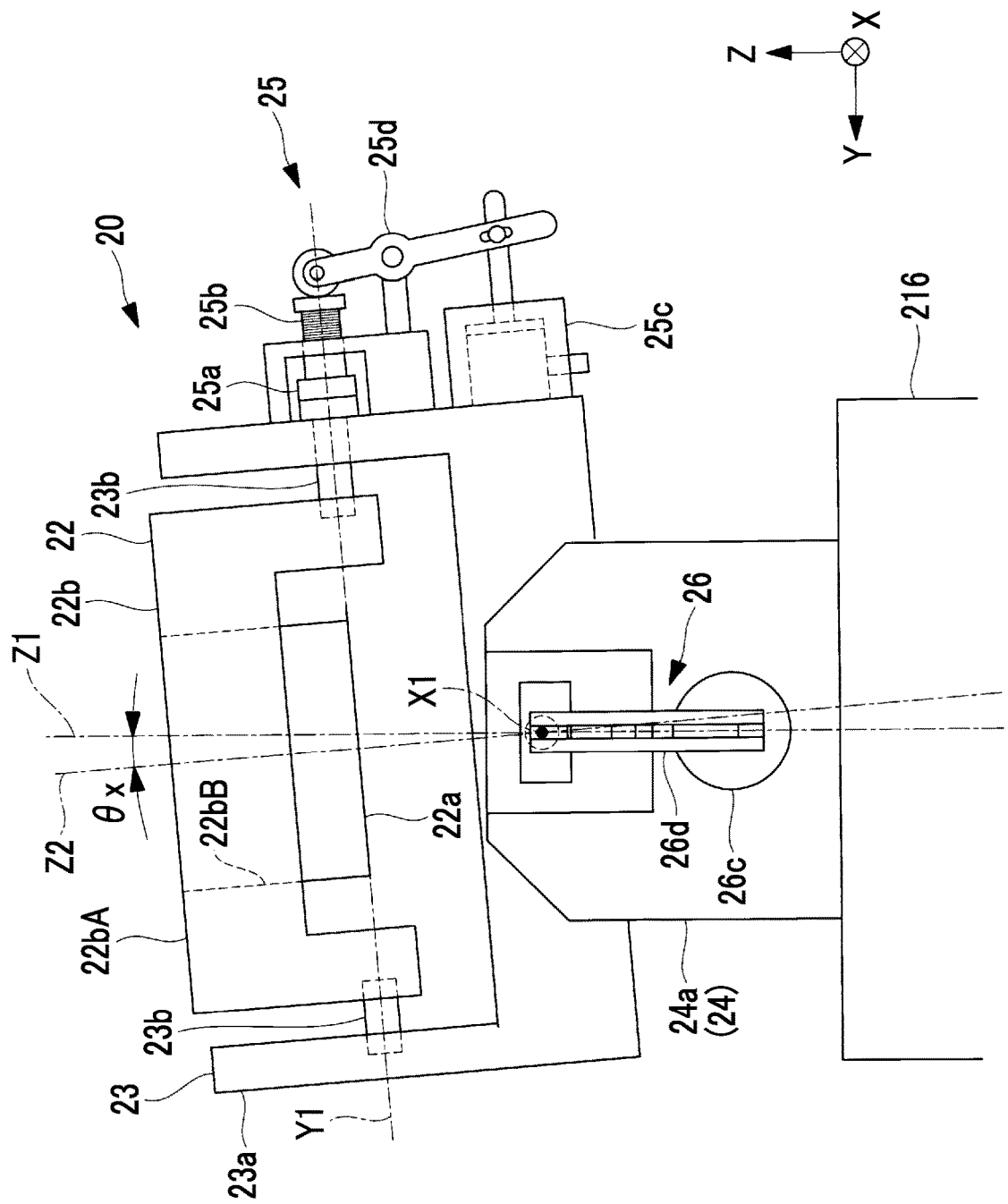
FIG. 5 is a side view of the flaw detection head shown in FIG. 1, as viewed in the X direction.

Next, the flaw detection head 20 of the ultrasonic flaw detection device 2 will be described. FIGS. 3 to 5 are side views of the flaw detection head 20 shown in FIG. 1, as viewed in the X direction. As shown in FIGS. 3 to 5, the flaw detection head 20 has a flaw detection unit 22, a first swinging mechanism 23, a second swinging mechanism 24, a first lock mechanism 25, and a second lock mechanism 26.

The flaw detection unit 22 has a probe 22a that transmits and receives ultrasonic waves, and a contact part (a contact medium holding part) 22b on which a contact surface 22bA that comes into contact with a surface-to-be-inspected 41 of the composite material 4 is formed. A water storage tank 22bB for storing (holding) water as a contact medium that fills the space between the probe 22a and the surface-to-be-inspected 41 of the composite material 4 is formed in the contact part 22b. Water is supplied to the water storage tank 22bB from an inflow port (not shown), so that a state where the space between the probe 22a and the surface-to-be-inspected 41 of the composite material 4 is filled with the water can be maintained.

The first swinging mechanism 23 has a main body portion 23a and a pair of shaft members 23b fixed to the main body portion 23a and extending along a swinging axis Y1 parallel to the Y axis. The first swinging mechanism 23 supports the contact part 22b of the flaw detection unit 22 so as to be swingable around the swinging axis Y1.

The second swinging mechanism 24 has a main body portion 24a and a pair of shaft members (not shown) fixed to the main body portion 24a and extending along a swinging axis X1 parallel to the X axis. The second swinging mechanism 24 supports the main body portion 23a of the first swinging mechanism 23 so as to be swingable around the swinging axis X1. Since the first swinging mechanism 23 supports the flaw detection unit 22, the second swinging mechanism 24 supports the contact part 22b of the flaw detection unit 22 through the first swinging mechanism 23 so as to be swingable around the swinging axis X1.

The first lock mechanism 25 is a mechanism that switches between a swinging state where the flaw detection unit 22 can swing around the swinging axis Y1 and a locked state where the flaw detection unit 22 cannot swing around the swinging axis Y1. The first lock mechanism 25 has a disc brake 25a for coming into contact with the shaft member 23b to fix the shaft member 23b such that it does not rotate around the swinging axis Y1, a spring member 25b that generates a biasing force that separates the disc brake 25a from the shaft member 23b, an air cylinder 25c that generates a biasing force that overcomes the biasing force of the spring member 25b by compressed air that is introduced from the outside, and a transmission mechanism 25d that transmits the biasing force generated by the air cylinder 25c to the disc brake 25a.

In a case where the compressed air is not supplied from a compressed air supply source (not shown) to the air cylinder 25c according to a control command from a control unit 90 (described later), a state is created where the disc brake 25a is separated from the shaft member 23b, as shown in FIG. 3. In this case, the first lock mechanism 25 supports the flaw detection unit 22 in a swinging state where the flaw detection unit 22 can swing around the swinging axis Y1.

On the other hand, in a case where the compressed air is supplied from the compressed air supply source (not shown) to the air cylinder 25c according to a control command from the control unit 90, a state is created where the disc brake 25a is in contact with the shaft member 23b, as shown in FIG. 4. In this case, the first lock mechanism 25 supports the flaw detection unit 22 in a locked state where the flaw detection unit 22 cannot swing around the swinging axis Y1.

The second lock mechanism 26 is a mechanism that switches between a swinging state where the first swinging mechanism 23 can swing around the swinging axis X1 and a locked state where the first swinging mechanism 23 cannot swing around the swinging axis X1. Since the first swinging mechanism 23 supports the flaw detection unit 22, the second lock mechanism 26 switches between a swinging state where the flaw detection unit 22 can swing around the swinging axis X1 and a locked state where the flaw detection unit 22 cannot swing around the swinging axis X1.

The second lock mechanism 26 has the same structure as the first lock mechanism 25 and includes a disc brake (not shown) for coming into contact with a shaft member (not shown), which is fixed the main body portion 23a of the first swinging mechanism 23, to fix the shaft member such that the shaft member does not rotate around the swinging axis X1, a spring member (not shown) that generates a biasing force that separates the disc brake from the shaft member, an air cylinder 26c that generates a biasing force that overcomes the biasing force of the spring member by compressed air that is introduced from the outside, and a transmission mechanism 26d that transmits the biasing force generated by the air cylinder 26c to the disc brake.

In a case where the compressed air is not supplied from the compressed air supply source (not shown) to the air cylinder 26c according to a control command from the control unit 90 (described later), a state is created where the disc brake is separated from the shaft member. In this case, the second lock mechanism 26 supports the flaw detection unit 22 in a swinging state where the flaw detection unit 22 can swing around the swinging axis X1.

On the other hand, in a case where the compressed air is supplied from the compressed air supply source (not shown) to the air cylinder 26c according to a control command from the control unit 90, a state is created where the disc brake is in contact with the shaft member. In this case, the second lock mechanism 26 supports the flaw detection unit 22 in a locked state where the flaw detection unit 22 cannot swing around the swinging axis X1.

FIG. 5 shows a state where the second lock mechanism 26 causes the contact surface 22bA of the flaw detection unit 22 to be inclined from the horizontal direction and the flaw detection unit 22 is in a locked state where it cannot swing around the swinging axes X1. In FIG. 5, an axis Z1 is an axis parallel to the axis Z extending in the vertical direction. An axis Z2 is an axis orthogonal to the contact surface 22bA of the flaw detection unit 22 and passes through the swinging axis X1. As shown in FIG. 5, the axis Z2 is inclined with respect to the axis Z1 by an angle ex around the swinging axis X1. The second lock mechanism 26 allows the flaw detection unit 22 to be in the locked state in a state where the contact surface 22bA of the flaw detection unit 22 is inclined by the angle ex with respect to the horizontal plane according to a control command from the control unit 90.

Figure 6:
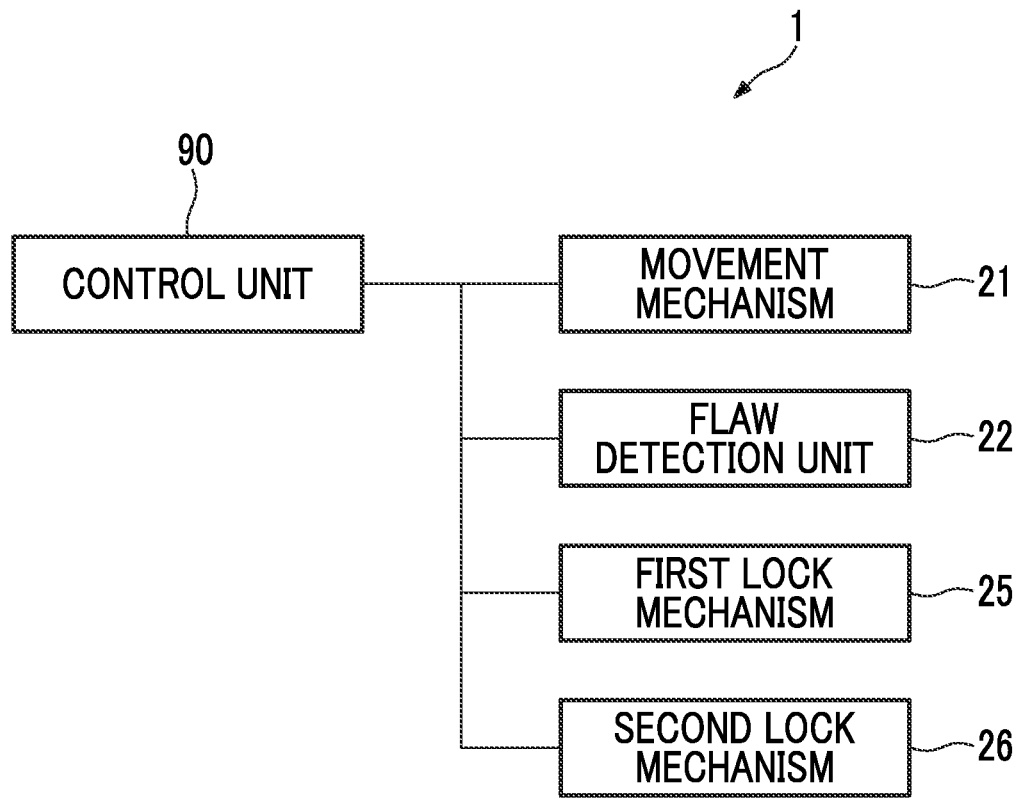
FIG. 6 is a block diagram showing a control configuration of the ultrasonic flaw detection system.

FIG. 6 is a block diagram showing a control configuration of the ultrasonic flaw detection system 1 of the present embodiment. As shown in FIG. 6, the ultrasonic flaw detection system 1 includes the movement mechanism 21, the flaw detection unit 22, the first lock mechanism 25, the second lock mechanism 26, and the control unit 90. The control unit 90 transmits a control command for controlling the movement mechanism 21, the flaw detection unit 22, the first lock mechanism 25, and the second lock mechanism 26 to the entire system including them.

Figure 7:
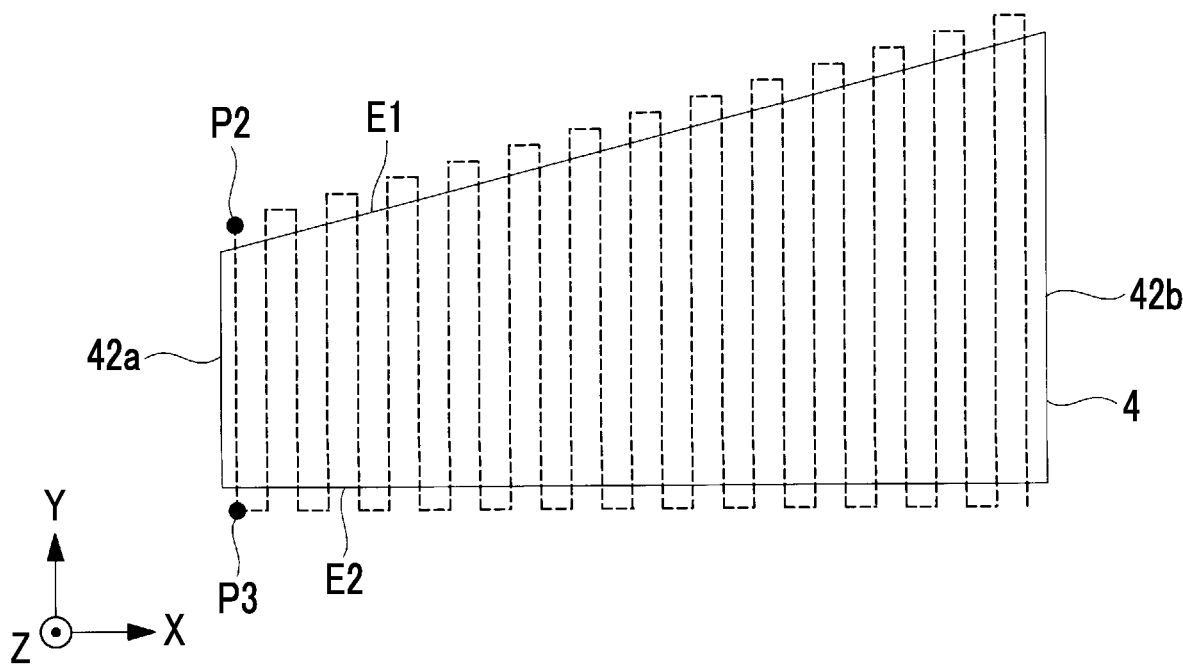
FIG. 7 is a diagram showing an example of a movement locus of the flaw detection head that moves due to flaw detection processing of a composite material.

FIG. 7 is a diagram showing an example of a movement locus of the flaw detection head 20 that moves according to the flaw detection processing of the composite material 4 which is executed by the control unit 90 of the ultrasonic flaw detection system 1 of the present embodiment. The broken line shown in FIG. 7 shows the movement locus of the flaw detection head 20. As shown in FIG. 7, the control unit 90 moves the flaw detection head 20 from the first protrusion portion 42a toward the second protrusion portion 42b of the composite material 4 while alternately repeating the movement along the Y axis and the movement along the X axis.

The control unit 90 moves the flaw detection head 20 along the Y axis from a second position P2 separated from a first end portion E1 in the Y-axis direction of the composite material 4 to a third position P3 separated from a second end portion E2 in the Y-axis direction of the composite material 4. Further, the control unit 90 moves the flaw detection head 20 along the Y axis from one end portion (the first protrusion portion 42a or the second protrusion portion 42b) in the X-axis direction of the composite material 4 toward the other end portion (the second protrusion portion 42b or the first protrusion portion 42a) in the X-axis direction of the composite material 4.

Figure 8:
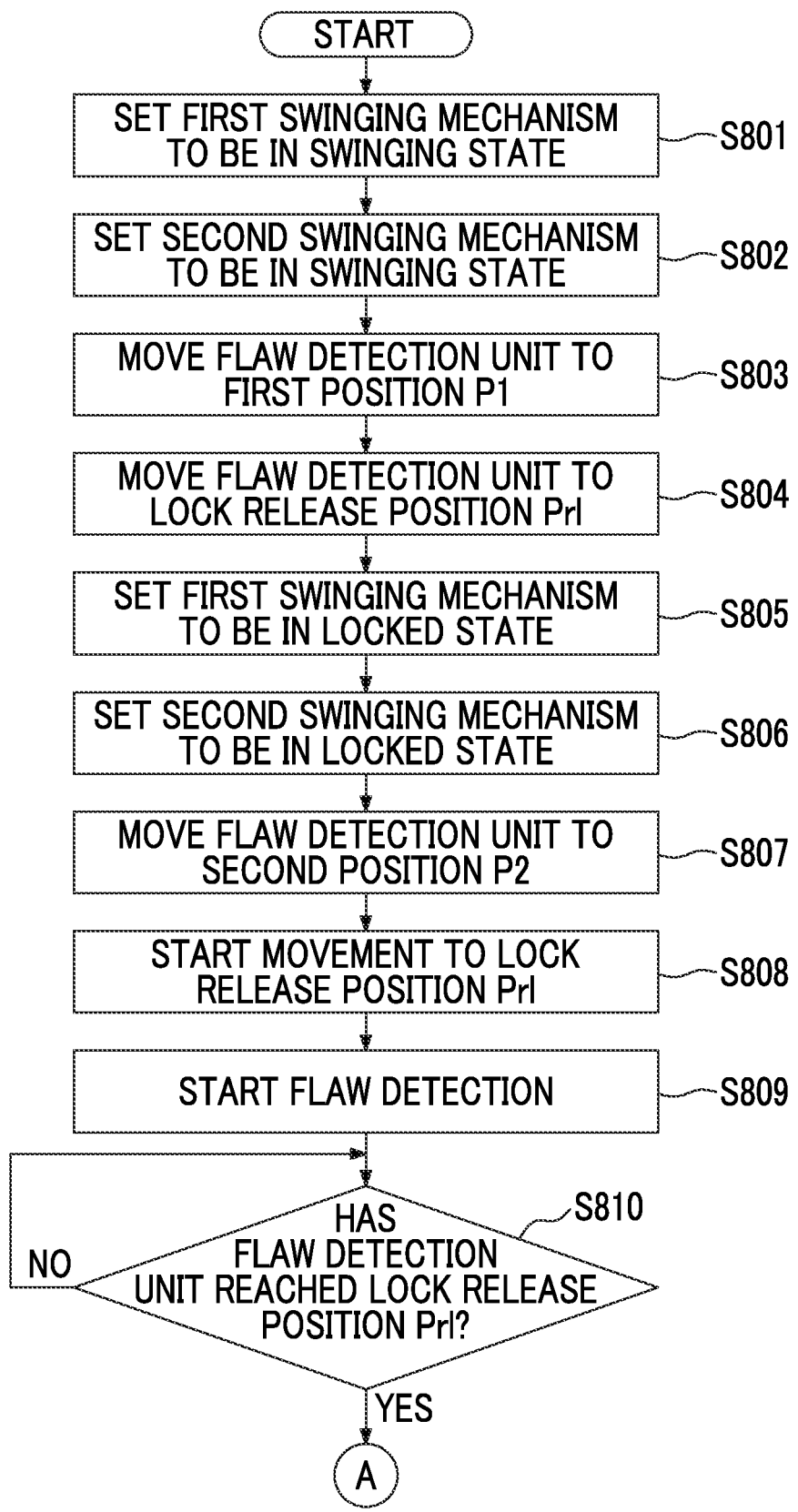
FIG. 8 is a flowchart showing composite material flaw detection processing that is executed by a control unit.
Figure 9:
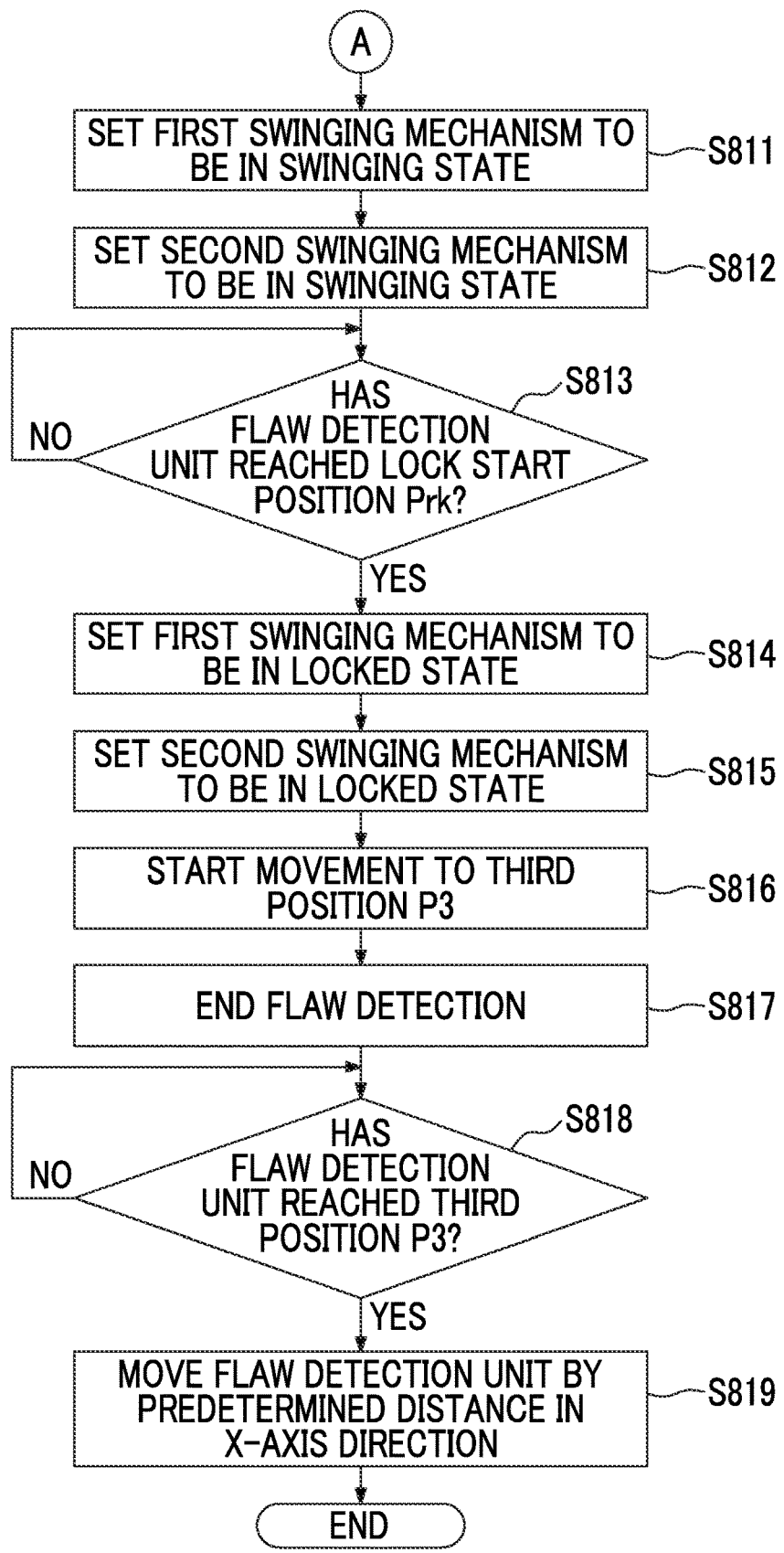
FIG. 9 is a flowchart showing the composite material flaw detection processing that is executed by the control unit.

Next, the flaw detection processing of the composite material 4 which is executed by the control unit 90 of the present embodiment will be described with reference to FIGS. 8 to 15. FIGS. 8 and 9 are flowcharts showing the flaw detection processing of the composite material 4 which is executed by the control unit 90. Each processing shown in FIGS. 8 and 9 is performed by the control unit 90 reading a control program from a storage unit (not shown) and executing the process.

Figure 10:
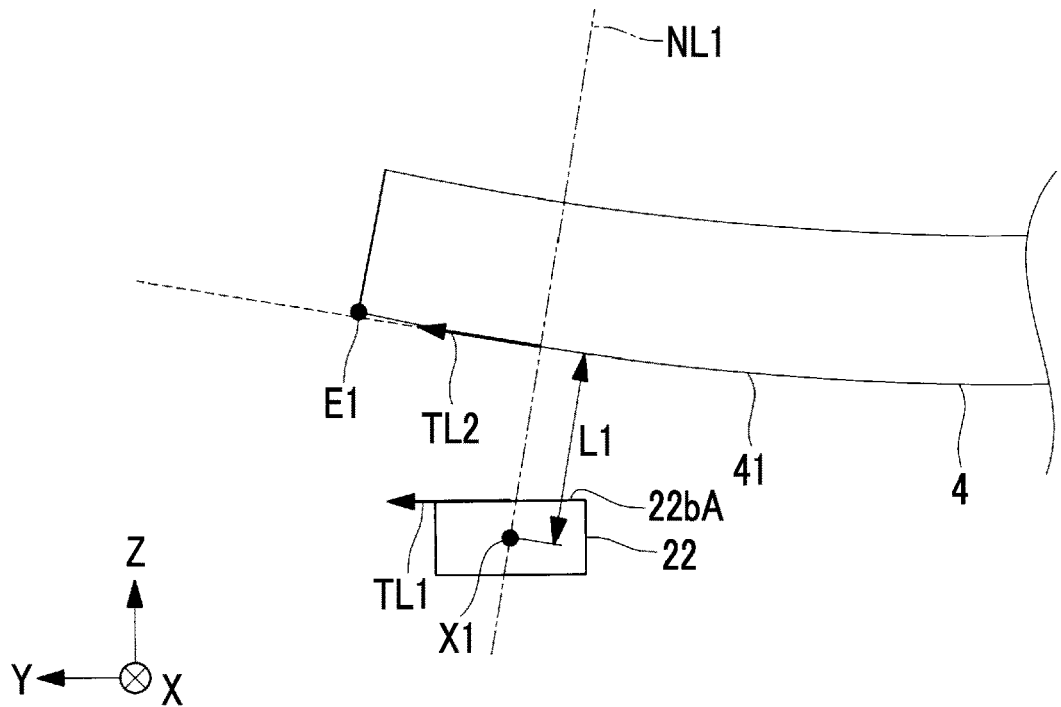
FIG. 10 is a side view showing a flaw detection unit in a state where it has moved to a first position.
Figure 11:
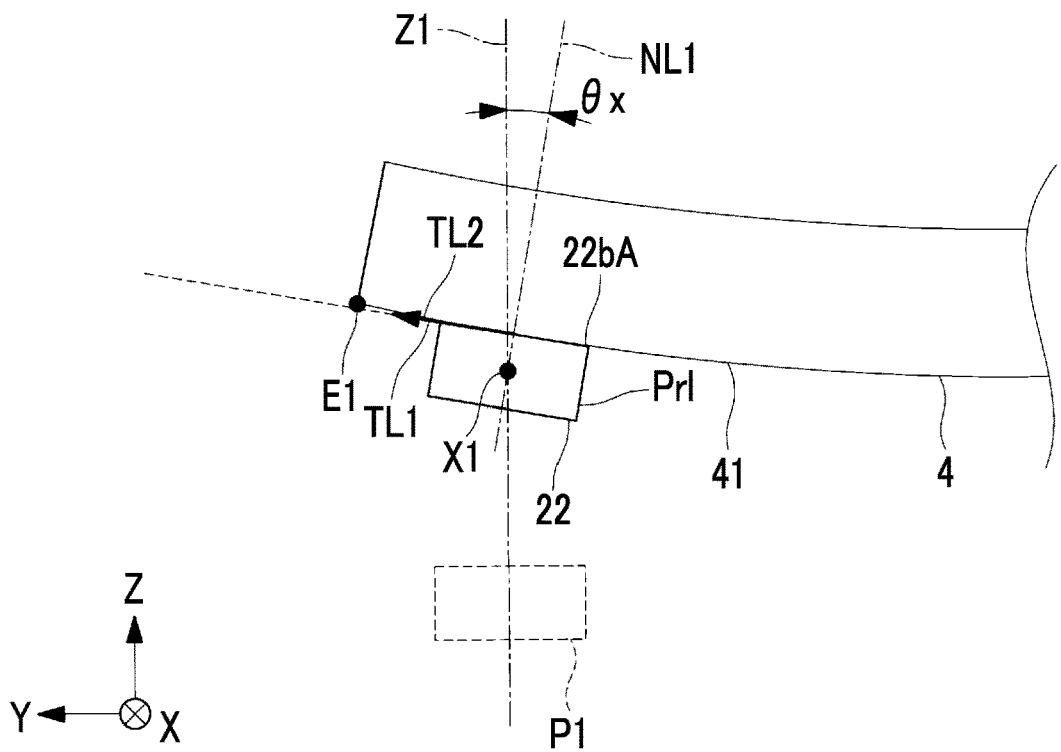
FIG. 11 is a side view showing the flaw detection unit in a state where it has moved to a lock release position.
Figure 12:
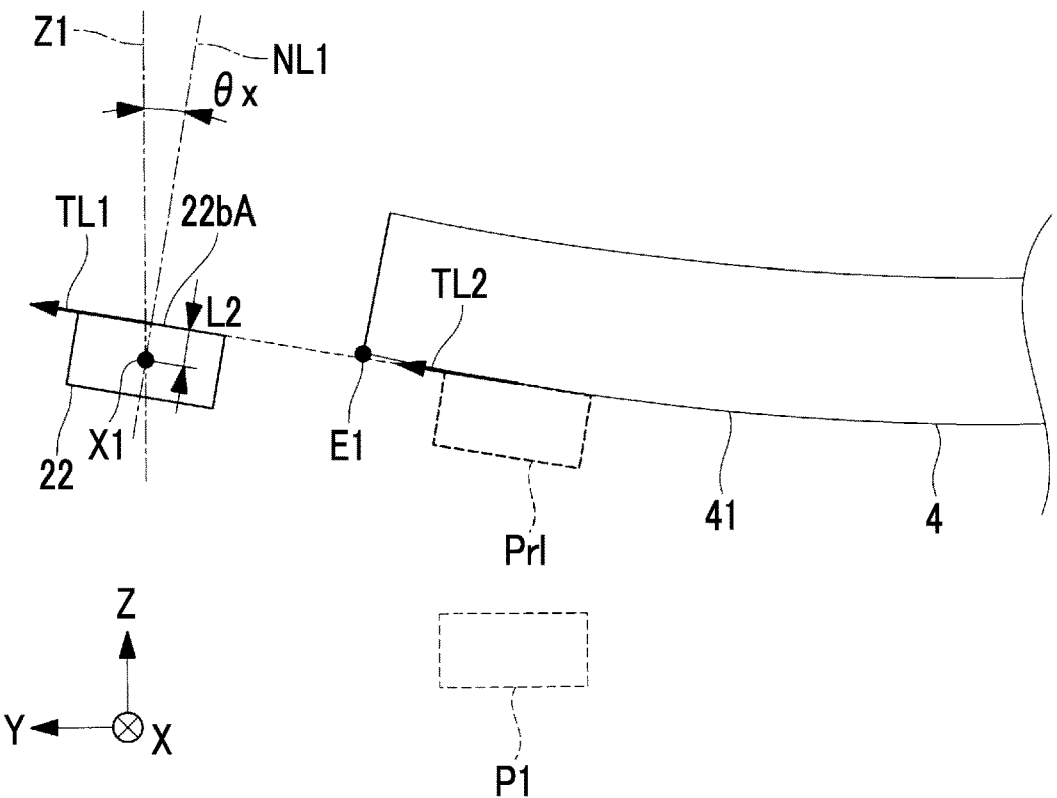
FIG. 12 is a side view showing the flaw detection unit in a state where it has moved to a second position.
Figure 13:
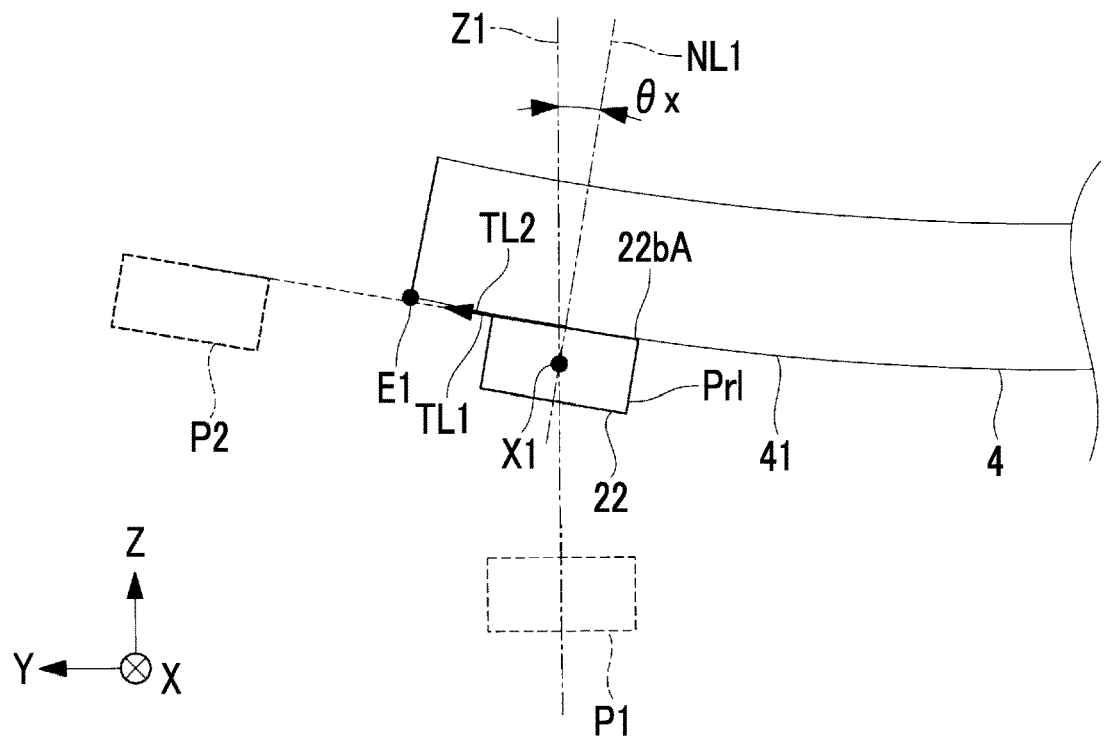
FIG. 13 is a side view showing the flaw detection unit in a state where it has reached the lock release position.
Figure 14:
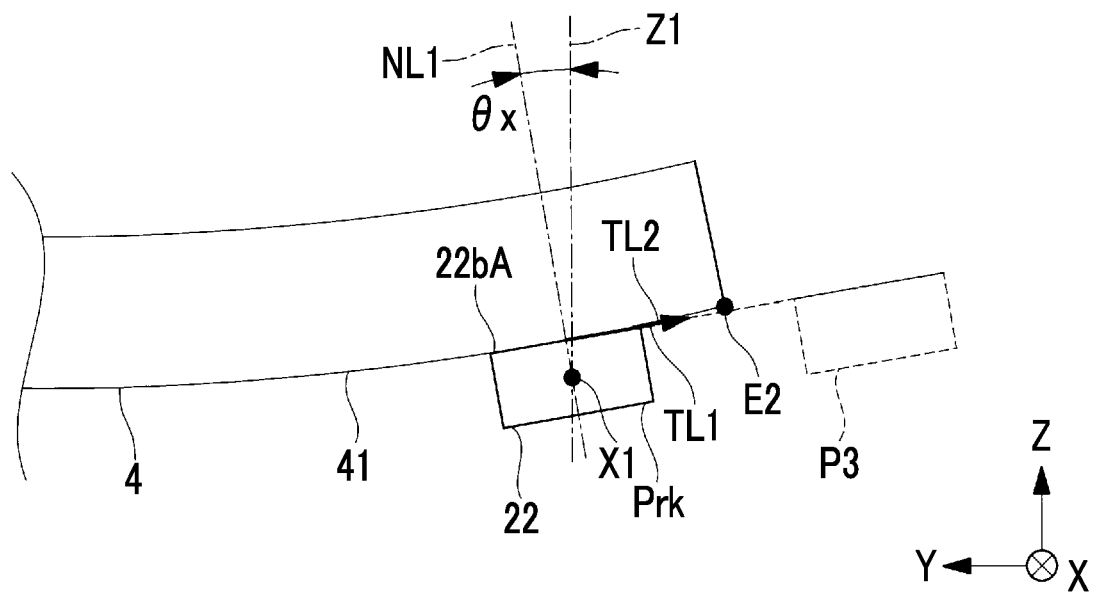
FIG. 14 is a side view showing the flaw detection unit in a state where it has reached a lock start position.
Figure 15:
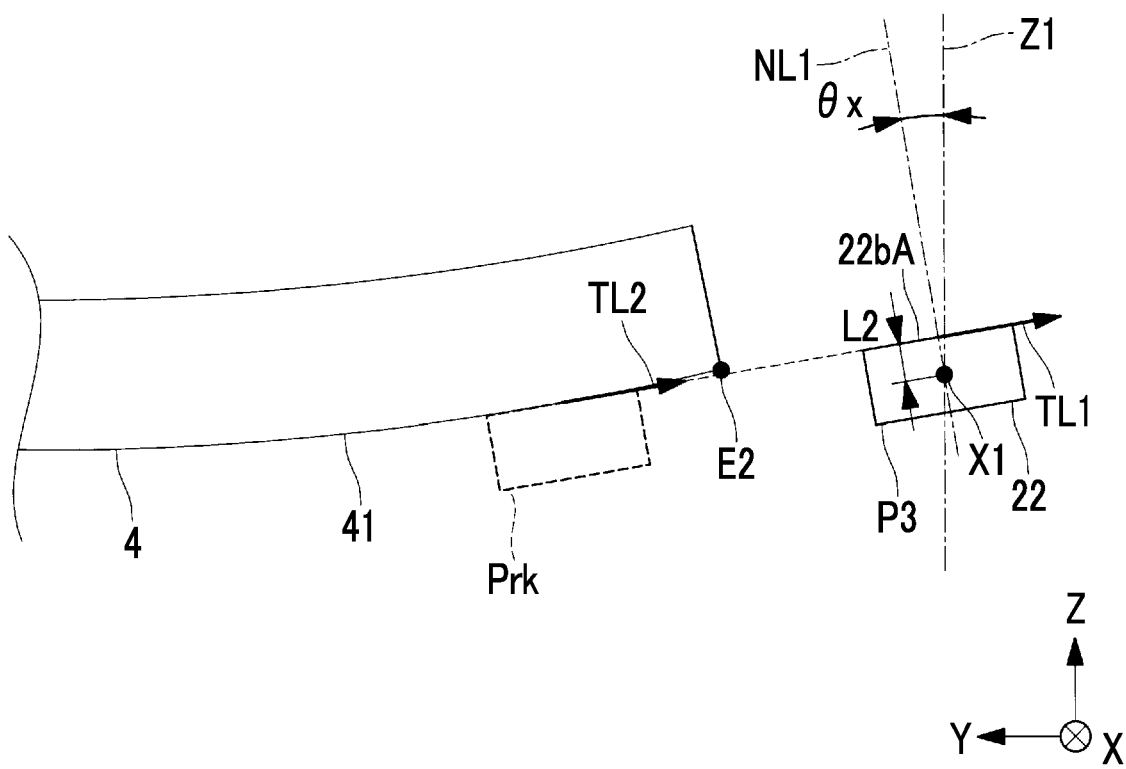
FIG. 15 is a side view showing the flaw detection unit in a state where it has reached a third position.

FIG. 10 is a side view showing the flaw detection unit 22 in a state where it has moved to a first position P1. FIG. 11 is a side view showing the flaw detection unit 22 in a state where it has moved to a lock release position Prl. FIG. 12 is a side view showing the flaw detection unit 22 in a state where it has moved to the second position P2. FIG. 13 is a side view showing the flaw detection unit 22 in a state where it has reached the lock release position Prl. FIG. 14 is a side view showing the flaw detection unit 22 in a state where it has reached a lock start position Prk. FIG. 15 is a side view showing the flaw detection unit 22 in a state where it has reached the third position P3.

In step S801, the control unit 90 controls the first lock mechanism 25 so as to set the first swinging mechanism 23 to be in a swinging state. The first swinging mechanism set to be in the swinging state supports the flaw detection unit 22 in a swinging state where the flaw detection unit 22 can swing around the swinging axis Y1.

In step S802, the control unit 90 controls the second lock mechanism 26 so as to set the second swinging mechanism 24 to be in a swinging state. The second swinging mechanism set to be in the swinging state supports the flaw detection unit 22 in a swinging state where the flaw detection unit 22 can swing around the swinging axis X1.

In step S803, the control unit 90 controls the movement mechanism 21 so as to move the flaw detection unit 22 to the first position P1. The first position P1 is a position where the swinging axis X1 of the flaw detection unit 22 is separated from the surface-to-be-inspected 41 by a first distance L1 in the direction along a normal line NL1 to the surface-to-be-inspected 41. As shown in FIG. 10, in a state where the flaw detection unit 22 has moved to the first position P1, a tangential direction TL1 to the contact surface 22bA of the flaw detection unit 22 and a tangential direction TL2 at a passing position of the normal line NL1 to the surface-to-be-inspected 41 of the composite material 4 do not coincide with each other.

In step S804, the control unit 90 moves the flaw detection unit 22 in the swinging state vertically upward along the Z axis from the first position P1 until the contact surface 22bA comes into contact with the surface-to-be-inspected 41. The position where the contact surface 22bA of the flaw detection unit 22 comes into contact with the surface-to-be-inspected 41 coincides with the lock release position Prl (described later). As shown in FIG. 11, by bringing the flaw detection unit 22 in the swinging state into contact with the surface-to-be-inspected 41, a state is created where the tangential direction TL1 to the contact surface 22bA and the tangential direction TL2 to the surface-to-be-inspected 41 coincide with each other.

In step S805, the control unit 90 controls the first lock mechanism 25 so as to set the first swinging mechanism 23 to be in a locked state. The control unit 90 controls the first lock mechanism 25 to switch the swinging state to the locked state in a state where the contact surface 22bA is in contact with the surface-to-be-inspected 41.

In step S806, the control unit 90 controls the second lock mechanism 26 so as to set the second swinging mechanism 24 to be in a locked state. The control unit 90 controls the second lock mechanism 26 to switch the swinging state to the locked state in a state where the contact surface 22bA is in contact with the surface-to-be-inspected 41. As shown in FIG. 11, steps S805 and S806 described above are executed, whereby the flaw detection unit 22 enters the locked state in a state where the tangential direction TL1 to the contact surface 22bA and the tangential direction TL2 to the surface-to-be-inspected 41 coincide with each other. As shown in FIG. 11, the angle formed by the axis Z1 parallel to the Z axis and the normal line NL1 is ex.

In step S807, the control unit 90 controls the movement mechanism 21 so as to move the flaw detection unit 22 to the second position P2. As shown in FIG. 12, the second position P2 is a position where the swinging axis X1 of the flaw detection unit 22 is separated by a predetermined distance in the tangential direction TL2 to the surface-to-be-inspected 41 from the first end portion E1 of the surface-to-be-inspected 41. Further, the second position P2 is a position separated by a second distance L2, which is shorter than the first distance L1, in the direction along the normal line NL1 to the surface-to-be-inspected 41. As shown in FIG. 12, the angle formed by the axis Z1 parallel to the Z axis and the normal line NL1 is maintained at ex as in FIG. 11.

In step S808, the control unit 90 controls the movement mechanism 21 such that the flaw detection unit 22 starts movement from the second position P2 to the lock release position Prl along the tangential direction TL2 to the surface-to-be-inspected 41. The control unit 90 controls the first lock mechanism 25 and the second lock mechanism so as to maintain the locked state until the flaw detection unit 22 moves from the second position P2 to the lock release position Prl.

In step S809, the control unit 90 controls the flaw detection unit 22 so as to start the flaw detection of the surface-to-be-inspected 41 by transmitting and receiving ultrasonic waves in response to the arrival of the contact surface 22bA of the flaw detection unit 22 at the surface-to-be-inspected 41.

In step S810, the control unit 90 determines whether or not the flaw detection unit 22 has reached the lock release position Prl shown in FIG. 13, and in a case where it is determined that the flaw detection unit 22 has reached the lock release position Prl, the processing proceeds to step S811.

In step S811, the control unit 90 controls the first lock mechanism 25 so as to set the first swinging mechanism 23 to be in a swinging state. The first swinging mechanism set to be in the swinging state supports the flaw detection unit 22 in a swinging state where the flaw detection unit 22 can swing around the swinging axis Y1.

In step S812, the control unit 90 controls the second lock mechanism 26 so as to set the second swinging mechanism 24 to be in a swinging state. The second swinging mechanism set to be in the swinging state supports the flaw detection unit 22 in a swinging state where the flaw detection unit 22 can swing around the swinging axis X1.

The flaw detection unit 22 which has entered the swinging state in steps S811 and S812 moves toward the lock start position Prk along the Y axis in a state where the tangential direction TL1 to the contact surface 22bA coincides with the tangential direction TL2 to the surface-to-be-inspected 41. The control unit 90 controls the position in the Z-axis direction of the flaw detection unit 22 so as to maintain a state where the contact surface 22bA and the surface-to-be-inspected 41 are in contact with each other.

In step S813, the control unit 90 determines whether or not the flaw detection unit 22 has reached the lock start position Prk shown in FIG. 14, and in a case where it is determined that the flaw detection unit 22 has reached the lock start position Prk, the processing proceeds to step S814.

In step S814, the control unit 90 controls the first lock mechanism 25 so as to set the first swinging mechanism 23 to be in a locked state. The control unit 90 controls the first lock mechanism 25 to switch the swinging state to the locked state in a state where the contact surface 22bA is in contact with the surface-to-be-inspected 41.

In step S815, the control unit 90 controls the second lock mechanism 26 so as to set the second swinging mechanism 24 to be in a locked state. The control unit 90 controls the second lock mechanism 26 to switch the swinging state to the locked state in a state where the contact surface 22bA is in contact with the surface-to-be-inspected 41. As shown in FIG. 14, steps S814 and S815 described above are executed, whereby the flaw detection unit 22 enters the locked state in a state where the tangential direction TL1 to the contact surface 22bA and the tangential direction TL2 to the surface-to-be-inspected 41 coincide with each other. As shown in FIG. 14, the angle formed by the axis Z1 parallel to the Z axis and the normal line NL1 is ex.

In step S816, the control unit 90 controls the movement mechanism 21 such that the flaw detection unit 22 starts movement from the lock start position Prk to the third position P3 along the tangential direction TL2 to the surface-to-be-inspected 41. The control unit 90 controls the first lock mechanism 25 and the second lock mechanism so as to maintain the locked state until the flaw detection unit 22 moves from the lock start position Prk to the third position P3.

The third position P3 is a position where the swinging axis X1 of the flaw detection unit 22 is separated by a predetermined distance in the tangential direction TL2 to the surface-to-be-inspected 41 from the second end portion E2 of the surface-to-be-inspected 41. Further, the third position P3 is a position separated by the second distance L2 in the direction along the normal line NL1 to the surface-to-be-inspected 41.

In step S817, the control unit 90 controls the flaw detection unit 22 so as to end the flaw detection of the surface-to-be-inspected 41 by stopping the transmission and reception of the ultrasonic waves in response to the contact surface 22bA of the flaw detection unit 22 being separated from the surface-to-be-inspected 41.

In step S818, the control unit 90 determines whether the flaw detection unit 22 has reached the third position P3 shown in FIG. 15, and in a case where it is determined that the flaw detection unit 22 has reached the third position P3, the processing proceeds to step S819.

In step S819, the control unit 90 controls the movement mechanism 21 so as to move the flaw detection unit 22 by a predetermined distance in the X-axis direction, and ends the processing of this flowchart. The control unit 90 repeats the processing from step S801 to step S819 described above, thereby performing the flaw detection processing by moving the flaw detection head 20 along the Y axis, at a plurality of positions in the X-axis direction. In this way, the control unit 90 performs the flaw detection of the entire region of the surface-to-be-inspected 41 of the composite material 4 from the first protrusion portion 42a to the second protrusion portion 42b of the composite material 4.

The operation and effects of the ultrasonic flaw detection system 1 of the present embodiment described above will be described.

According to the ultrasonic flaw detection system 1 of the present embodiment, when moving the flaw detection unit 22 to the lock release position Prl along the tangential direction TL2 to the surface-to-be-inspected 41, a state is maintained where the tangential direction TL1 to the contact surface 22bA of the flaw detection unit 22 and the tangential direction TL2 to the surface-to-be-inspected 41 of the composite material 4 coincides with each other. Therefore, it is possible to bring the contact surface 22bA of the flaw detection unit 22 into contact with the surface of the first end portion E1 of the composite material 4 without the contact of the flaw detection unit 22 with the first end portion E1 of the composite material 4. Since the flaw detection unit 22 is in the locked state, a state where the entire region of the contact surface 22bA of the flaw detection unit 22 is in contact with the surface-to-be-inspected 41 of the composite material 4 is maintained, and thus it is possible to avoid the flaw detection inspection from becoming impossible due to the occurrence of a gap due to the non-contact between the contact surface 22bA and the surface-to-be-inspected 41.

Further, according to the ultrasonic flaw detection system 1 of the present embodiment, by moving the flaw detection unit 22 in the swinging state from the first position P1 to bring the contact surface 22bA into contact with the surface-to-be-inspected 41 and switching it to the locked state in that state, it is possible to create a state where the tangential direction TL1 to the contact surface 22bA of the flaw detection unit 22 coincides with the tangential direction TL2 to the surface-to-be-inspected 41 of the composite material 4, and maintain the state. Further, by moving the flaw detection unit 22 from the second position P2 closer to the surface-to-be-inspected 41 than the first position P1 to the lock release position Prl, it is possible to avoid the flaw detection unit 22 from colliding with the first end portion E1 of the composite material 4.

Further, according to the ultrasonic flaw detection system 1 of the present embodiment, by moving the flaw detection unit 22 in the swinging state along the surface-to-be-inspected 41 while maintaining a state where the contact surface 22bA is in contact with the surface-to-be-inspected 41, it is possible to perform the flaw detection while adjusting the contact surface 22bA to an appropriate angle along the shape of the surface-to-be-inspected 41.

If the flaw detection unit 22 is in the swinging state when performing the flaw detection on the second end portion E2 of the surface-to-be-inspected 41, there is a possibility that the flaw detection unit 22 may swing when the flaw detection unit 22 passes through the second end portion E2. In this case, a gap is formed between the contact surface 22bA of the flaw detection unit 22 and the surface-to-be-inspected 41, so that a state is created where the flaw detection of the end portion region of the surface-to-be-inspected 41 is not performed. Therefore, in the ultrasonic flaw detection system 1 of the present embodiment, the flaw detection unit 22 is moved to the third position P3 after switching from the swinging state to the locked state. In this way, it is possible to avoid a state where the flaw detection of the end portion region of the surface-to-be-inspected 41 is not performed.

Further, according to the ultrasonic flaw detection system 1 of the present embodiment, since the first swinging mechanism 23 and the second swinging mechanism 24 swing the flaw detection unit 22 around the swinging axes X1 and Y1, even in a case where the surface-to-be-inspected 41 of the composite material 4 has a three-dimensional curved surface shape having curvatures in a plurality of directions, it is possible to swing the flaw detection unit 22 such that the tangential direction TL2 to the surface-to-be-inspected 41 of the composite material 4 and the tangential direction TL1 to the contact surface 22bA coincide with each other. Further, since the first lock mechanism 25 and the second lock mechanism 26 can create a locked state of making it impossible to swing around the swinging axes X1 and Y1, it is possible to fix the contact surface 22bA of the flaw detection unit 22 at an appropriate swinging angle according to the three-dimensional curved surface shape.

Further, according to the ultrasonic flaw detection system 1 of the present embodiment, by adopting the local water immersion type flaw detection unit 22, it is possible to perform the flaw detection of the object-to-be-inspected without using a large-scale facility for immersing the object-to-be-inspected in water.

[Other Embodiments]

In the above description, it has been assumed that the ultrasonic flaw detection system 1 adopts the local water immersion type flaw detection unit 22. However, other aspects is also acceptable. For example, a water immersion type ultrasonic flaw detection system adopting a water immersion type flaw detection unit is also acceptable. The water immersion type ultrasonic flaw detection system includes a flaw detection unit having a probe that transmits and receives ultrasonic waves in a state of being in contact with a surface-to-be-inspected of a water-immersed composite material (for example, a bent stringer that is used in a main wing of an aircraft). Since the periphery of the flaw detection unit of the water immersion type ultrasonic flaw detection system is filled with water, it is not necessary to provide a water storage tank for storing water as a contact medium that fills the space between the flaw detection unit and the surface-to-be-inspected of the composite material. By adopting the water immersion type flaw detection unit, it is possible to reliably maintain a state where water is filled between the probe and the surface of the object-to-be-inspected, and improve the accuracy of the flaw detection.

REFERENCE SIGNS LIST

1: ultrasonic flaw detection system
2: ultrasonic flaw detection device
20: flaw detection head
21: movement mechanism
22: flaw detection unit
22a: probe
22b: contact part
22bA: contact surface
23: first swinging mechanism
24: second swinging mechanism
25: first lock mechanism
26: second lock mechanism
31bA: first end portion
31bB: second end portion
41: surface-to-be-inspected
90: control unit
Prk: lock start position
Prl: lock release position
X1, Y1: swinging axis

The invention claimed is:

1. An ultrasonic flaw detection device comprising:
a flaw detection mechanism that inspects an object-to-be-inspected by transmitting and receiving ultrasonic waves;
a movement mechanism that moves the flaw detection mechanism with respect to the object-to-be-inspected; and
a control unit that controls the flaw detection mechanism and the movement mechanism,
wherein the flaw detection mechanism includes
a flaw detection unit having a probe that transmits and receives the ultrasonic waves and a contact part on which a contact surface that comes into contact with a surface-to-be-inspected of the object-to-be-inspected is formed,
a swinging mechanism that supports the flaw detection unit so as to be swingable around a swinging axis, and
a lock mechanism that switches between a swinging state where the flaw detection unit can swing around the swinging axis and a locked state where the flaw detection unit cannot swing around the swinging axis,
wherein the control unit controls the lock mechanism and the movement mechanism so as to
cause the flaw detection unit to be in the locked state in a state where a tangential direction to the contact surface and a tangential direction to the surface-to-be-inspected coincide with each other, when moving the flaw detection unit to a position separated from a first end portion of the surface-to-be-inspected in the tangential direction, and to cause the flaw detection unit to be in a lock release position away from the first end portion, when moving the flaw detection unit along a direction opposite to the tangential direction, and
switch the locked state to the swinging state after the flaw detection unit has reached the lock release position, and
wherein the control unit controls the lock mechanism and the movement mechanism so as to
move the flaw detection unit in the swinging state from a first position separated by a first distance in a normal direction to the surface-to-be-inspected from the surface-to-be-inspected until the contact surface comes into contact with the surface-to-be-inspected,
move the flaw detection unit in the locked stated from a position in which the contact surface contacts with the surface-to-be-inspected to a second position separated in the tangential direction from the first end portion of the surface-to-be-inspected and separated by a second distance shorter than the first distance in the normal direction to the surface-to-be-inspected, and
move the flaw detection unit in the locked state from the second position to the lock release position along the direction opposite to the tangential direction, the flaw detection unit being maintained in the locked state at each position from the second position to the lock release position, and the first end portion of the surface-to-be-inspected is between the second position and the lock release position.

2. The ultrasonic flaw detection device according to claim 1, wherein the control unit controls the lock mechanism and the movement mechanism so as to move the flaw detection unit along the surface-to-be-inspected while maintaining a state where the contact surface is in contact with the surface-to-be-inspected, after the flaw detection unit reaches the lock release position and the locked state is switched to the swinging state.

3. The ultrasonic flaw detection device according to claim 1, wherein the control unit controls the lock mechanism and the movement mechanism so as to
switch the swinging state to the locked state in response to arrival of the flaw detection unit in the swinging state at a lock start position in the vicinity of a second end portion of the surface-to-be-inspected, and
move the flaw detection unit in the locked state to a third position separated in the tangential direction to the surface-to-be-inspected from the second end portion along the tangential direction to the surface-to-be-inspected.

4. The ultrasonic flaw detection device according to claim 1, wherein the swinging mechanism is a mechanism that swings the flaw detection unit around a pair of swinging axes orthogonal to each other, and
the lock mechanism is a mechanism that switches between a swinging state where the flaw detection unit can swing around the pair of swinging axes and a locked state where the flaw detection unit cannot swing around the pair of swinging axes.

5. The ultrasonic flaw detection device according to claim 1, wherein the flaw detection unit is a local water immersion type flaw detection unit having a contact medium holding part for filling a space between the probe and the surface-to-be-inspected with a contact medium.

6. The ultrasonic flaw detection device according to claim 1, wherein the flaw detection unit is a water immersion type flaw detection unit that transmits and receives ultrasonic waves in a state where the surface-to-be-inspected of the object-to-be-inspected immersed in water is in contact with the contact surface.

7. A method for controlling an ultrasonic flaw detection device that includes a flaw detection unit having a probe that transmits and receives ultrasonic waves and a contact surface that comes into contact with a surface-to-be-inspected of an object-to-be-inspected, a movement mechanism that moves the flaw detection unit with respect to the object-to-be-inspected, a swinging mechanism that supports the flaw detection unit so as to be swingable around a swinging axis, and a lock mechanism that switches between a swinging state where the flaw detection unit can swing around the swinging axis and a locked state where the flaw detection unit cannot swing around the swinging axis, the method comprising:
- a first control step of causing the flaw detection unit to be in the locked state in a state where a tangential direction to the contact surface and a tangential direction to the surface-to-be-inspected coincide with each other, and moving the flaw detection unit in the locked state from a position in which the contact surface contacts with the surface-to-be-inspected to a second position separated in the tangential direction from the first end portion of the surface-to-be-inspected;
- a second control step of moving the flaw detection unit in the locked state from the second position along a direction opposite to the tangential direction to a lock release position away from the first end portion;
- a third control step of switching the locked state to the swinging state after the flaw detection unit has reached the lock release position; and
- a fourth control step of moving the flaw detection unit along the surface-to-be-inspected while maintaining a state where the contact surface is in contact with the surface-to-be-inspected, wherein the lock mechanism and the movement mechanism are operated so as to
move the flaw detection unit in the swinging state from a first position separated by a first distance in a normal direction to the surface-to-be-inspected from the surface-to-be-inspected until the contact surface comes into contact with the surface-to-be-inspected,
move the flaw detection unit in the locked state from a position in which the contact surface contacts the surface-to-be-inspected to a second position separated in the tangential direction from the first end portion of the surface-to-be-inspected and separated by a second distance shorter than the first distance in the normal direction to the surface-to-be-inspected, and
move the flaw detection unit in the locked state from the second position to the lock release position along the direction opposite to the tangential direction, the flaw detection unit being maintained in the locked state at each position from the second position to the lock release position, and the first end portion of the surface-to-be-inspected is between the second position and the lock release position.

* * * * *